(12) United States Patent
Choy et al.

(10) Patent No.: US 9,767,764 B2
(45) Date of Patent: Sep. 19, 2017

(54) METHOD FOR CONTROLLING DISPLAY BRIGHTNESS AND ELECTRONIC DEVICE THEREOF

(71) Applicant: Samsung Electronics Co., Ltd., Gyeonggi-do (KR)

(72) Inventors: Sung-Hak Choy, Seoul (KR); C. H. Lee, Seoul (KR); Seong-Joon Jeon, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 98 days.

(21) Appl. No.: 14/475,336

(22) Filed: Sep. 2, 2014

(65) Prior Publication Data

US 2015/0062104 A1    Mar. 5, 2015

(30) Foreign Application Priority Data

Sep. 2, 2013  (KR) ........................ 10-2013-0104801

(51) Int. Cl.
*G09G 5/10* (2006.01)
*G09G 5/00* (2006.01)
*H04M 1/02* (2006.01)

(52) U.S. Cl.
CPC ............... *G09G 5/10* (2013.01); *G09G 5/006* (2013.01); *H04M 1/0283* (2013.01); *G09G 2320/0626* (2013.01); *G09G 2320/08* (2013.01); *H04M 2250/12* (2013.01)

(58) Field of Classification Search
CPC ....... G09G 5/10; G09G 5/006; H04M 1/0283; H04M 1/0245; H04B 1/38; H04B 1/3888; H05K 5/03; A45C 11/00; A45C 11/02
See application file for complete search history.

(56) References Cited

U.S. PATENT DOCUMENTS

| | | | | |
|---|---|---|---|---|
| 2010/0110052 | A1* | 5/2010 | Togawa ................ | G06F 1/1677 345/207 |
| 2013/0300679 | A1* | 11/2013 | Oh ......................... | A45C 11/00 345/173 |
| 2014/0128131 | A1* | 5/2014 | Sin ........................ | H04M 1/185 455/575.8 |

\* cited by examiner

*Primary Examiner* — Jennifer Mehmood
*Assistant Examiner* — Sardis F Azongha

(57) ABSTRACT

A method for determining the screen brightness in the electronic device includes determining whether a flip cover opens or closes a screen when the screen display event occurs, determining a first brightness value for a full screen display mode when the flip cover is opened, and determining a second brightens value for a flip covered window display. Other embodiments including an apparatus for determining the screen brightness are also disclosed.

18 Claims, 12 Drawing Sheets

METHOD FOR CONTROLLING DISPLAY BRIGHTNESS AND ELECTRONIC DEVICE THEREOF

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Sep. 2, 2013, and assigned Serial No. 10-2013-0104801, the entire disclosure of which is hereby incorporated by reference.

TECHNICAL FIELD

The present disclosure relates generally to a method for controlling a screen brightness of a display in an electronic device.

BACKGROUND

Recent electronic devices, for example, mobile devices are advancing to multimedia devices for providing various services such as voice and video telephony, information input/output, and data transmission/reception. Electronic device users can place various cases or covers (e.g., flip cover, pouch cover, or bumper) on the electronic device for prevention of a scratch or a shock crack of the electronic device or for an aesthetic purpose.

SUMMARY

To address the above-discussed deficiencies, it is a primary aspect of the present disclosure to provide a method and an apparatus for determining a first brightness value for a first screen display mode and a second brightness value for a second screen display mode based on the first brightness value in an electronic device.

The first screen display mode may be a display mode when a front side of a display of the electronic device is exposed, and the second screen display mode may be a display mode when only part of the display of the electronic device is exposed.

Another aspect of the present disclosure is to provide a method and an apparatus for determining whether an automatic brightness mode is active in an electronic device.

Yet another aspect of the present disclosure is to provide a method and an apparatus for determining a first brightness value based on a light sensor value when an automatic brightness mode is active in an electronic device.

Still another aspect of the present disclosure is to provide a method and an apparatus for updating a first brightness value based on a light sensor value when a period for updating the first brightness value arrives in an electronic device.

A further aspect of the present disclosure is to provide a method and an apparatus for, when a first brightness value is updated, updating the first brightness value with a second brightness value in an electronic device.

A further aspect of the present disclosure is to provide a method and an apparatus for, when a cover is closed, maintaining a first brightness value before the cover is closed in an electronic device.

A further aspect of the present disclosure is to provide a method and an apparatus for setting a first storage space for storing the first brightness value and a second storage space for storing the second brightness value, to different storage spaces.

A further aspect of the present disclosure is to provide a method and an apparatus for, when a first brightness value is determined, storing the first brightness value to a first storage space and a second storage space at the same time in an electronic device.

According to one aspect of the present disclosure, a method for determining a screen brightness in an electronic device includes determining whether a screen display event occurs, when the screen display event occurs, determining whether a cover is opened or closed, when the cover is opened, determining a first brightness value of a first screen display mode; and based on at least part of the first brightness value, determining a second brightness value of a second screen display mode (e.g., the cover including a window covers the display of the electronic device and the display corresponding to the window display the screen).

The second brightness value may be equal to the first brightness value. The second brightness value may be selected based on the first brightness value. For example, the second brightness value may be greater or lesser than the first brightness value.

Herein, the screen display mode of the display when the front side of the display is exposed can be referred to as a full screen display mode. The screen display mode when the cover including the window covers the display of the electronic device and only the display corresponding to the window displays the screen can be referred to as a cover window display mode.

So far, the display screen operates in the different mode according to the opened or closed cover. Yet, a plurality of different screen display modes can be implemented regardless of the opened or closed cover. For example, the electronic device can include the first screen display mode of a first status for controlling the display brightness using a light sensor, and a second screen display mode of a second status when the light sensor is unavailable. In this case, the electronic device can determine the second brightness of the second screen display mode based on the first brightness of the first screen display mode.

According to another aspect of the present disclosure, an electronic device includes one or more displays, one or more light sensors, one or more memories, and one or more processors for determining whether a screen display event occurs, when the screen display event occurs, determining whether a cover is opened or closed, when the cover is opened, determining a first brightness value of a full screen display mode, and based on at least part of the first brightness value, determining a second brightness value of a cover window display mode.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The following description with reference to the accompanying drawings is provided to assist in a comprehensive understanding of embodiments of the disclosure as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
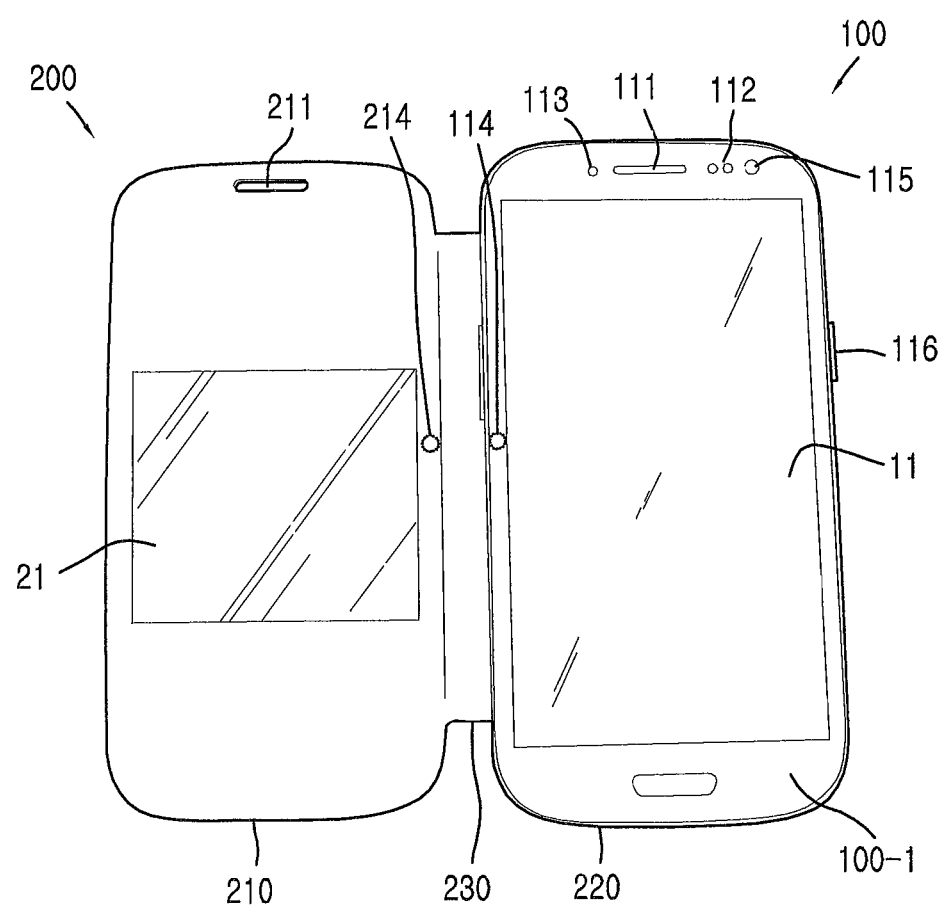
FIG. 1 illustrates an electronic device and a cover device connected according to embodiments of the present disclosure.
Figure 2:
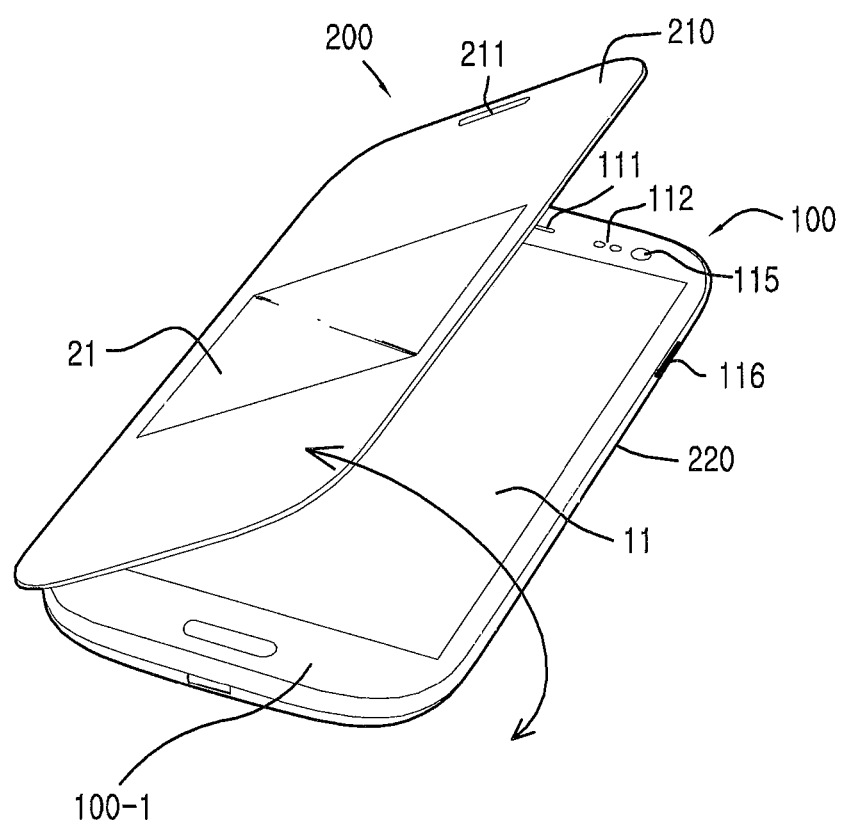
FIG. 2 illustrates the cover of FIG. 1 opened and closed in the electronic device according to embodiments of the present disclosure.
Figure 3:
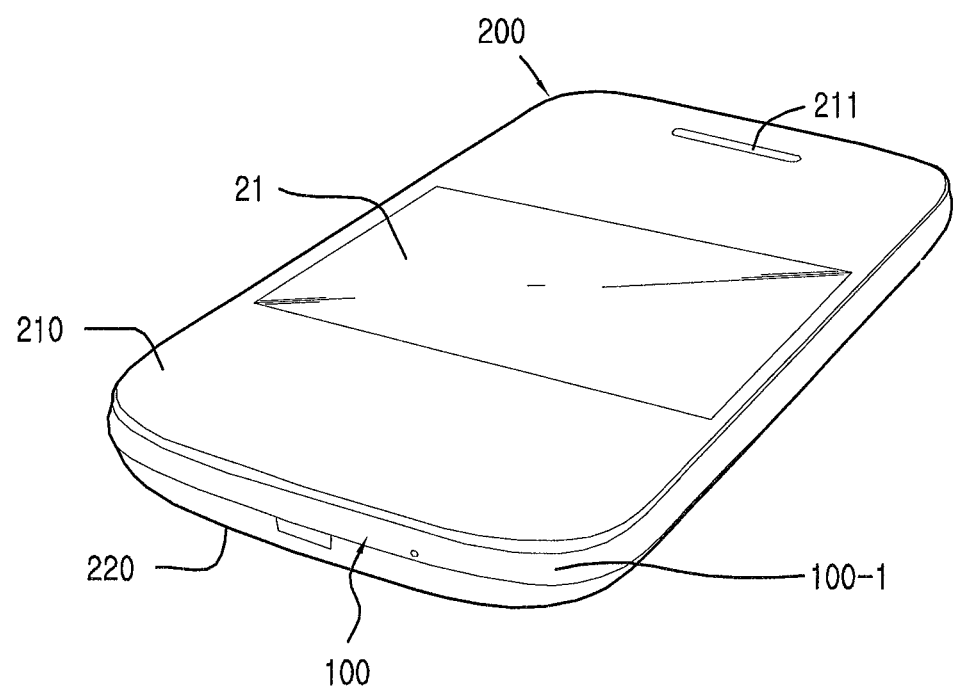
FIG. 3 illustrates the closed cover of FIG. 1 in the electronic device according to embodiments of the present disclosure.

As discussed above, what is needed is a method for determining a brightness value of the full screen and a brightness value of the window screen of the cover by using the cover including the window in the electronic device FIGS. 1, 2 and 3 depict an electronic device and a cover device connected according to embodiments of the present disclosure.

Referring to FIGS. 1, 2 and 3, the electronic device 100 can include a main body 100-1 and a cover 200. Herein, the term, "electronic device" can indicate the main body excluding the cover.

In certain embodiments, a protection cover covering of the display includes a transparent window in order to address a drawback that the user has to open the cover of the display to use the electronic device. Thus, the user can perform simple operations, such as receiving a call or checking a message without opening the cover.

The main body 100-1 can include a front side, a back side, and four sides. The front side of the electronic device 100 can include a display (screen, touch screen, or display module) 11, a speaker 111, a sensor (e.g., proximity sensor, gesture sensor, luminance sensor or light sensor) 112, a Red Green Blue (RGB) sensor 113, a hall sensor 114, and a camera 115. In various embodiments of the present disclosure, a sensor for recognizing an Integrated Circuit (IC) chip of the cover can replace or be added to the hall sensor.

The cover 200 can be attached and detached to and from the main body 100-1. Alternatively, the cover 200 can be fixed to the main body 100-1.

The cover device 200 can include a first cover 210 directly or indirectly connected to at least part of the side of the electronic device 100. The first cover 210 can cover at least part of the front side of the electronic device 100 (a closed status), or expose the front side by detaching from at least part of the front side (an open status). Herein, such a cover can be referred to as a flip cover.

The cover 200 can include a second cover 220 for covering at least part of the back side (e.g., the side including a battery) of the electronic device 100. The second cover 220 can be detached from the back side of the main body 100-1.

Alternatively, the cover includes a front cover and a coupler connected to the front cover, and the coupler of the cover can be mounted to a side of the electronic device 100.

Those skilled in the art shall understand that the following structure is applicable to various other covers.

The cover 200 can include a connector 230 for connecting the first cover 210 and the second cover 220. The connector 230 can cover the side (e.g., the side interconnecting the front side and the back side) of the electronic device 100. The first cover 210 of the cover device 200 can include a through hole 211 corresponding to the speaker 111 of the electronic device 100. The first cover 210 of the cover device 200 can include a magnet 214 corresponding to the hall sensor 114 of the electronic device 100. The first cover 210 of the cover device 200 can include a transparent window 21.

The electronic device 100 can identify whether the first cover 210 of the cover device 200 is opened or closed, using at least one sensor (e.g., proximity sensor, gesture sensor, or hall sensor 114). For example, when the hall sensor 114 detects the magnet 214 of the first cover 210, the electronic device 100 can recognize that the first cover 210 of the cover device 200 is closed. Alternatively, the sensor of the electronic device 100 can detect the IC chip of the cover and recognize the open or closed cover.

The electronic device 100 can control its screen display in response to the open or closed first cover 210 of the cover device 200. The electronic device 100, when recognizing the closed first cover 210, can set a first display region (e.g., a partial screen region displayed through the window 21) of the display 11 to a display region. When recognizing the open first cover 210, the electronic device 100 can set a second display region (e.g., the full screen region) of the display 11 to the display region.

The electronic device 100 can display the screen in the display region in response to a preset event (e.g., power button input or call reception). For example, when the power button 116 is input, the electronic device 100 can display notification information (e.g., current time, remaining battery capacity, or communication condition) in the set display region. For example, the electronic device 100 can display notification information such as incoming message, incoming call, or alarm, in the display region.

The display 11 of the electronic device 100 can include a touch panel or a pen sensor (digitizer), and the electronic device 100 can detect a touch gesture in the set display region and control the display in response to the touch gesture.

The electronic device 100 can adjust touch sensitivity according to the opened or closed first cover 210. For example, when the first cover 210 is closed, the electronic device 100 can execute a hovering touch mode (for recognizing the touch in the display when the closed cover is touched (see FIG. 3)) by adjusting the touch sensitivity. When the first cover 210 is closed, the user can manipulate the electronic device 100 using the touch gesture (e.g., single touch, multi-touch, or flicking) for the operation control on the window 21 of the first cover 210.

Figure 4:
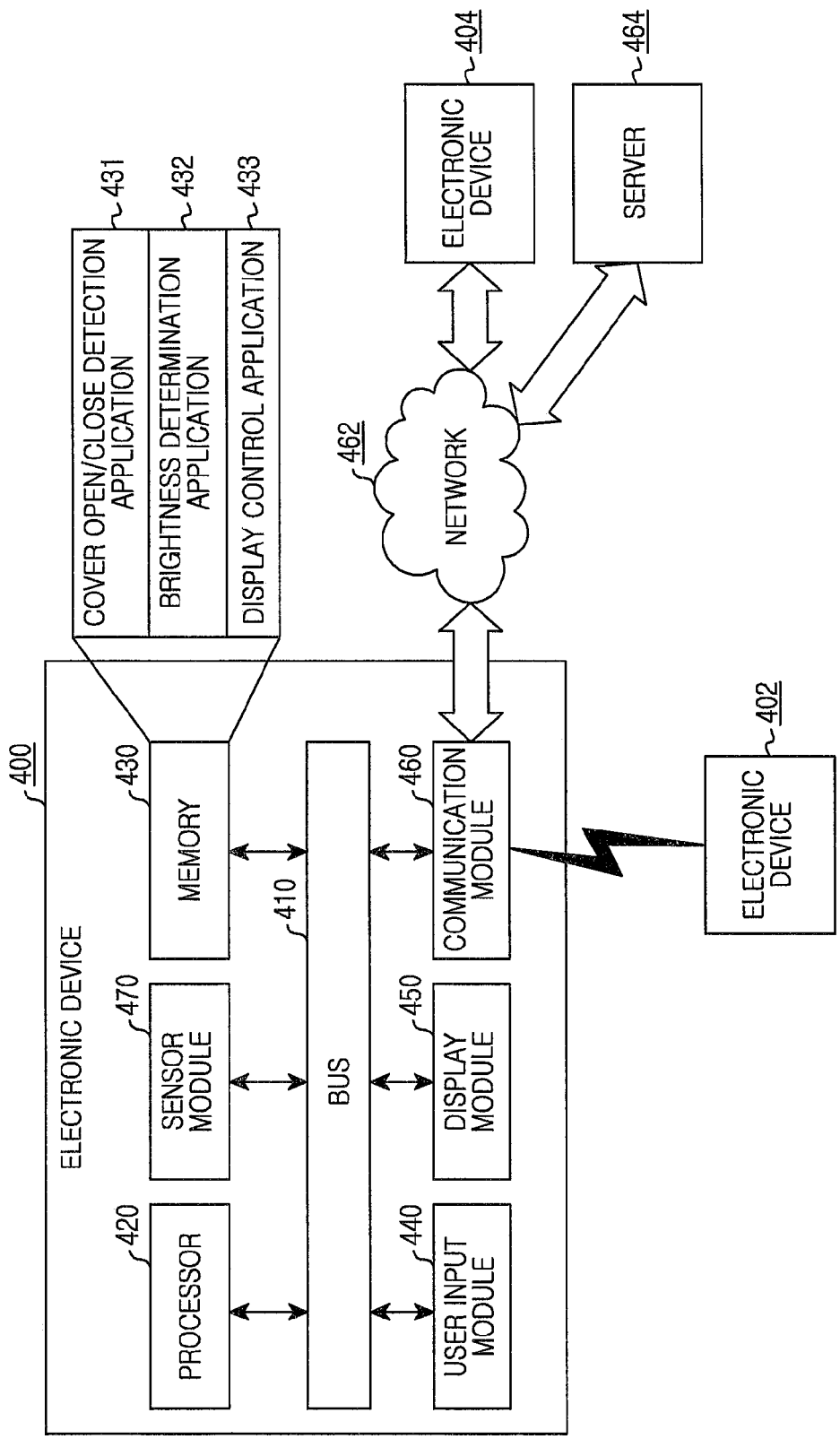
FIG. 4 illustrates the electronic device according to embodiments of the present disclosure.

FIG. 4 is a block diagram of an electronic device according to an embodiment of the present disclosure. Referring to FIG. 4, the electronic device 400 includes a bus 410, a processor 420, a memory 430, a user input module 440, a display module 450, and a communication module 460 or a sensor module 470. The electronic device can be the electronic device 100 of FIGS. 1, 2 and 3.

The bus 410 can be a circuit for interlinking the components (e.g., the bus 410, the processor 420, the memory 430, the user input module 440, the display module 450, and the communication module 460) of the electronic device 400 and transferring communication (e.g., control message) between the components.

Figure 5:
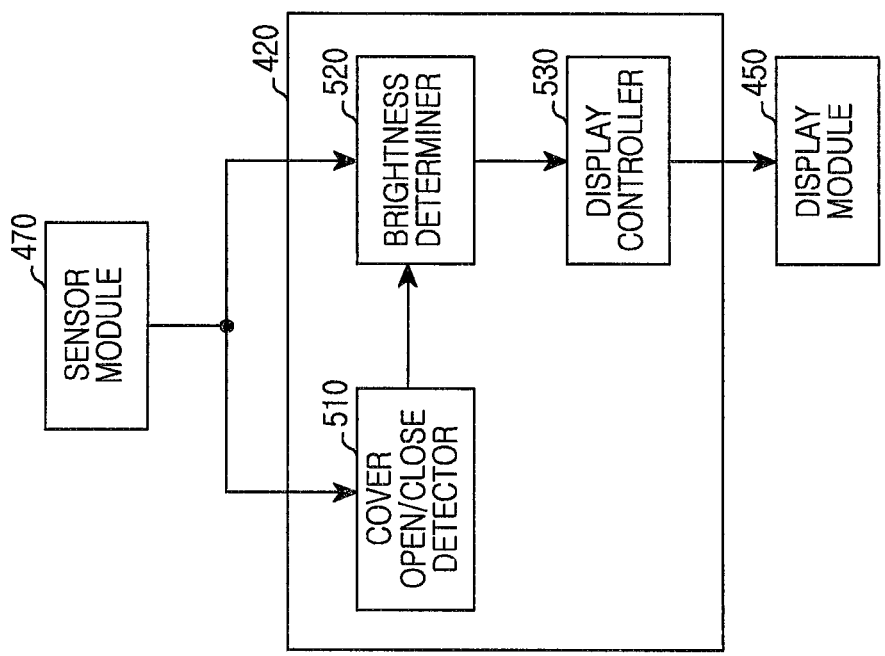
FIG. 5 illustrates a processor according to embodiments of the present disclosure.

The processor 420 can receive an instruction from the components of the electronic device 400 via the bus 410, interpret the received instruction, and perform an operation or a data processing according to the interpreted instruction. In so doing, the processor 420 controls to execute at least one application stored in the memory 430 and to provide a service according to the corresponding application. For example, the processor 420 can be constructed as shown in FIG. 5 to control the screen brightness by running a cover open/close detection application 431, a brightness determination application 432, and a display control application 433.

The processor 420 can include one or more Application Processors (APs) or one or more Communication Processors (CPs). Herein, the AP and the CP can be included in the processor 420 or different IC packages. The AP and the CP can be included in a single IC package. The AP can control hardware or software components connected to the AP by driving an operating system or an application program, and carry out data processing and operations including multimedia data. Herein, the AP can be implemented using a System on Chip (SoC). The CP can fulfill at least part of a multimedia control function. The CP can identify and authenticate a terminal in a communication network using a Subscriber Identity Module (SIM) card. The CP can provide the user with a service including voice telephony, video telephony, text message, and packet data. The CP can control data transmission and reception of the communication module 460. The AP or the CP can load and process the instruction or the data from its non-volatile memory or at least one of the other components, in a volatile memory. The AP or the CP can store data received from or generated by at least one of the other components, to the non-volatile memory. The CP can manage a data link in the communication between the electronic device including the hardware and other electronic device connected over a network, and convert a communication protocol. Herein, the CP can be implemented using the SoC. The processor 420 can further include a Graphics Processing Unit (GPU).

The memory 430 can store the instruction or the data received from or generated by the processor 420 or the other components (e.g., the user input module 440, the display module 450, and the communication module 460). The memory 430 can include an internal buffer and an external buffer.

The memory 430 can include the cover open/close detection application 431, the brightness determination application 432, and the display control application 433. The application can be configured as a programming module, and the program module can be implemented using software, firmware, and hardware, or a combination of two or more of them. The memory 430 can store a screen brightness value.

The cover open/close detection application 431 can include at least one software component for detecting whether the cover is opened or closed. For example, the cover open/close detection application 431 can identify whether the cover (e.g., the first cover 210 of the cover device 200) is opened or closed using at least one sensor (e.g., proximity sensor, gesture sensor, or hall sensor 114). For example, when the hall sensor 114 detects the magnet 214 of the first cover 210, the cover open/close detection application 431 can recognize that the first cover 210 of the cover device 200 is closed. When the hall sensor 114 does not detect the magnet 214 of the first cover 210, the cover open/close detection application 431 can recognize that the first cover 210 of the cover device 200 is opened.

The brightness determination application 432 includes at least one software component for determining the screen brightness of the display. For example, when a screen display event occurs, the brightness determination application 432 requests the cover open/close detection application 431 to check whether the cover is opened or closed. When the cover is opened, the brightness determination application 432 determines whether an automatic brightness is activated (ON). When the automatic brightness is activated, the brightness determination application 432 determines a first brightness value of the full screen display mode based on a light sensor value.

For example, at least partially based on the first brightness value, the brightness determination application 432 can determine a second brightness value for the cover window display mode. The second brightness value can equal the first brightness value.

For example, the second brightness value can be determined in a selected relation with the first brightness value. For example, the second brightness value can be greater or smaller than the first brightness value by the selected value or rate.

The display control application 433 includes at least one software component for controlling the screen display in consideration with the brightness value through the display module 450. When the screen display is requested, the display control application 433 can control the screen display based on the opened or closed cover (e.g., the first cover 210 of the cover device 200) using the cover open/close detection application 431.

For example, when the first cover 210 is closed, the display control application 433 can set the first display region (e.g., the partial screen region displayed through the window 21) of the display 11 to the display region. In so doing, the display control application 433 can display the screen in the first display region by considering the second brightness value. For example, when recognizing the open first cover 210, the display control application 433 can set the second display region (e.g., the full screen region) of the display 11 to the display region. In so doing, the display control application 433 can display the screen in the second display region by considering the first brightness value.

The memory 430 can include an internal memory or an external memory. The internal memory can include at least one of the volatile memory (e.g., Dynamic Random Access Memory (DRAM), Static RAM (SRAM), and Synchronous DRAM (SDRAM)) and the non-volatile memory (e.g., One-Time Programmable Read Only Memory (OTPROM), PROM, Erasable PROM (EPROM), Electrically EPROM (EEPROM), mask ROM, flash ROM, NAND flash memory, and NOR flash memory). The internal memory can employ a Solid State Drive (SSD). The external memory can include at least one of a Compact Flash (CF), Secure Digital (SD), Micro-SD, Mini-SD, xD, and memory stick.

The memory 430 can further include a kernel, middleware, and an Application Programming Interface (API). The kernel can control or manage system resources (e.g., the bus 410, the processor 420, or the memory 430) used to execute the operation or the function of other programming modules (e.g., the middle ware, the API, or the application). The kernel can provide an interface allowing the middleware, the API or the application to access and control or manage the components of the electronic device 400. The middleware relays data between the API or the application and the kernel. The middleware can perform load balancing of a work request by giving priority of the system resource (e.g., the bus 410, the processor 420, or the memory 430) of the electronic device 400 to the work requests received from at least one application. The API, which is an interface for the application to control the kernel or the middleware, can include at least one interface or function for file control, window control, image processing, or text control.

The user input module 440 can forward the instruction or the data from the user to the processor 420 or the memory 430 via the bus 410. For example, the user input module 440 can include a touch panel, a pen sensor, a key, or an ultrasonic input device. For example, the touch panel can recognize the touch input using at least one of capacitive, resistive, infrared, and Surface Acoustic Wave (SAW) techniques. Herein, the touch panel can further include a controller. The capacitive touch panel can recognize not only the direct touch but also the proximity. The touch panel can further include a tactile layer. The touch panel can provide a tactile response to the user. For example, the pen sensor can be implemented using the same or similar method as or to the user's touch input, or using a separate recognition sheet. For example, the key can include a keypad or a touch key. For example, the ultrasonic input device, which obtains data by detecting microwave in the electronic device through the pen which generates an ultrasonic signal, allows radio frequency identification.

The display module 450 can display an image, a video, or data to the user. For example, the display module 450 can include a panel or a hologram. For example, the panel can employ a Liquid Crystal Display (LCD) or an Active Matrix Organic Light Emitting Diode (AMOLED). The panel can be implemented flexibly, transparently, or wearably. Herein, the panel can be combined with the touch panel as a single module. For example, the hologram can present a three-dimensional image in the air using interference of light. The display module 450 can further include a control circuit for controlling the panel or the hologram.

The display module 450 can display the screen under control of the display control application 433. For example, the display module 450 can display the screen in the first display region (e.g., the partial screen region displayed on the window 21) of the display 11 according to a request of the display control application 433. In so doing, the display module 450 can display the screen in the first display region by considering the second brightness value. For example, the display module 450 can display the screen in the second display region (e.g., the full screen region) of the display 11 according to a request of the display control application 433. In so doing, the display module 450 can display the screen in the second display region by considering the first brightness value.

The communication module 460 can connect the communication between the electronic device 400 and other electronic devices 402 and 404. In so doing, the communication module 460 can support a short-range communication protocol (e.g., Wireless Fidelity (Wi-Fi), Bluetooth (BT), Near Field Communication (NFC)), or communication network (e.g., Internet, Local Area Network (LAN), Wide Area Network (WAN), telecommunication network, cellular network, satellite network, or Plain Old Telephone Service (POTS), 462).

The other electronic devices 402 and 404 can be the same as or different from the electronic device 400.

The sensor module 470 can include at least one of a light sensor, a gesture sensor, a proximity sensor, a gyro sensor, an atmospheric pressure sensor, a magnetic sensor, an acceleration sensor, a grip sensor, an RGB sensor, a biometric sensor, a temperature/humidity sensor, an UltraViolet (UV) sensor, and the hall sensor 114. The sensor module 470 can measure a physical quantity or detect the operation status of the electronic device, and convert the measured or detected information to an electric signal. The sensor module 470 can include an olfactory sensor, an electromyography (EMG) sensor, an electroencephalogram (EEG) sensor, an electrocardiogram (ECG) sensor, or a finger print sensor. The sensor module 470 can further include a control circuit for controlling one or more sensors. For example, the electronic device can detect the ambient light using the light sensor. For example, the electronic device can determine whether the cover is opened or closed using the gesture sensor, the proximity sensor, or the hall sensor 114.

The names of the hardware components according to various embodiments of the present disclosure can vary based on a type of the electronic device. The hardware according to various embodiments of the present disclosure can include at least one of the components, omit part of the components, or further include other components. Part of the hardware components can be integrated into a single unit to serve the same functions of the corresponding components.

FIG. 5 is a detailed block diagram of the processor according to embodiments of the present disclosure. As shown in FIG. 5, the processor 420 can include an open/close detector 510, a brightness determiner 520, and a display controller 530. Alternatively, various processors can perform the same functions.

The open/close detector 510 detects whether the cover is opened or closed by executing the open/close detection application 431 stored in the memory 430. For example, the cover open/close detector 510 can identify whether the cover (e.g., the first cover 210 of the cover device 200) is opened or closed using at least one sensor (e.g., proximity sensor, gesture sensor, or hall sensor 114). For example, when the hall sensor 114 detects the magnet 214 of the first cover 210, the cover open/close detector 510 can recognize that the first cover 210 of the cover device 200 is closed. When the hall sensor 114 does not detect the magnet 214 of the first cover 210, the cover open/close detector 510 can recognize that the first cover 210 of the cover device 200 is opened.

The brightness determiner 520 determines the screen brightness by executing the brightness determination application 432 stored in the memory 430. For example, when the screen display event occurs, the brightness determiner 520 requests the cover open/close detector 510 to check whether the cover is opened or closed. When the cover is opened, the brightness determiner 520 determines whether the automatic brightness is activated (ON). When the automatic brightness is activated, the brightness determiner 520 determines the first brightness value of the full screen display mode based on the light sensor value. In so doing, the brightness determiner 520 determines the second brightness value of the cover window display mode based on the first brightness value of the full screen display mode.

The display controller 530 controls the screen display in consideration with the brightness value through the display module 450 by executing the display control application 433 stored in the memory 430. When the screen display is requested, the display controller 530 can control the screen display based on the opened or closed cover (e.g., the first cover 210 of the cover device 200) using the cover open/close detector 510.

For example, when the first cover 210 is closed, the display controller 530 can set the first display region (e.g., the partial screen region displayed through the window 21) of the display 11 to the display region. In so doing, the display controller 530 can display the screen in the first display region by considering the second brightness value. For example, when recognizing the open first cover 210, the display controller 530 can set the second display region (e.g., the full screen region) of the display 11 to the display region. In so doing, the display controller 530 can display the screen in the second display region by considering the first brightness value.

Figure 6:
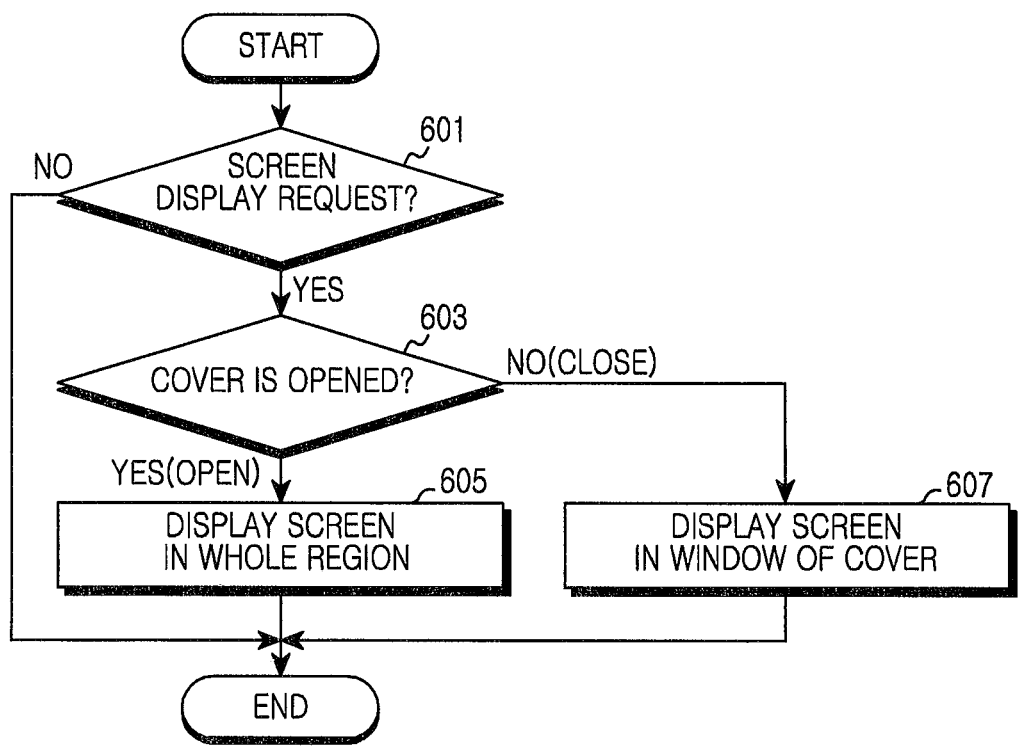
FIG. 6 illustrates a method for displaying a screen based on the closed or opened cover in the electronic device according to embodiments of the present disclosure.

FIG. 6 illustrates a method for displaying the screen based on the closed or opened cover in the electronic device according to embodiments of the present disclosure.

Figure 7A:
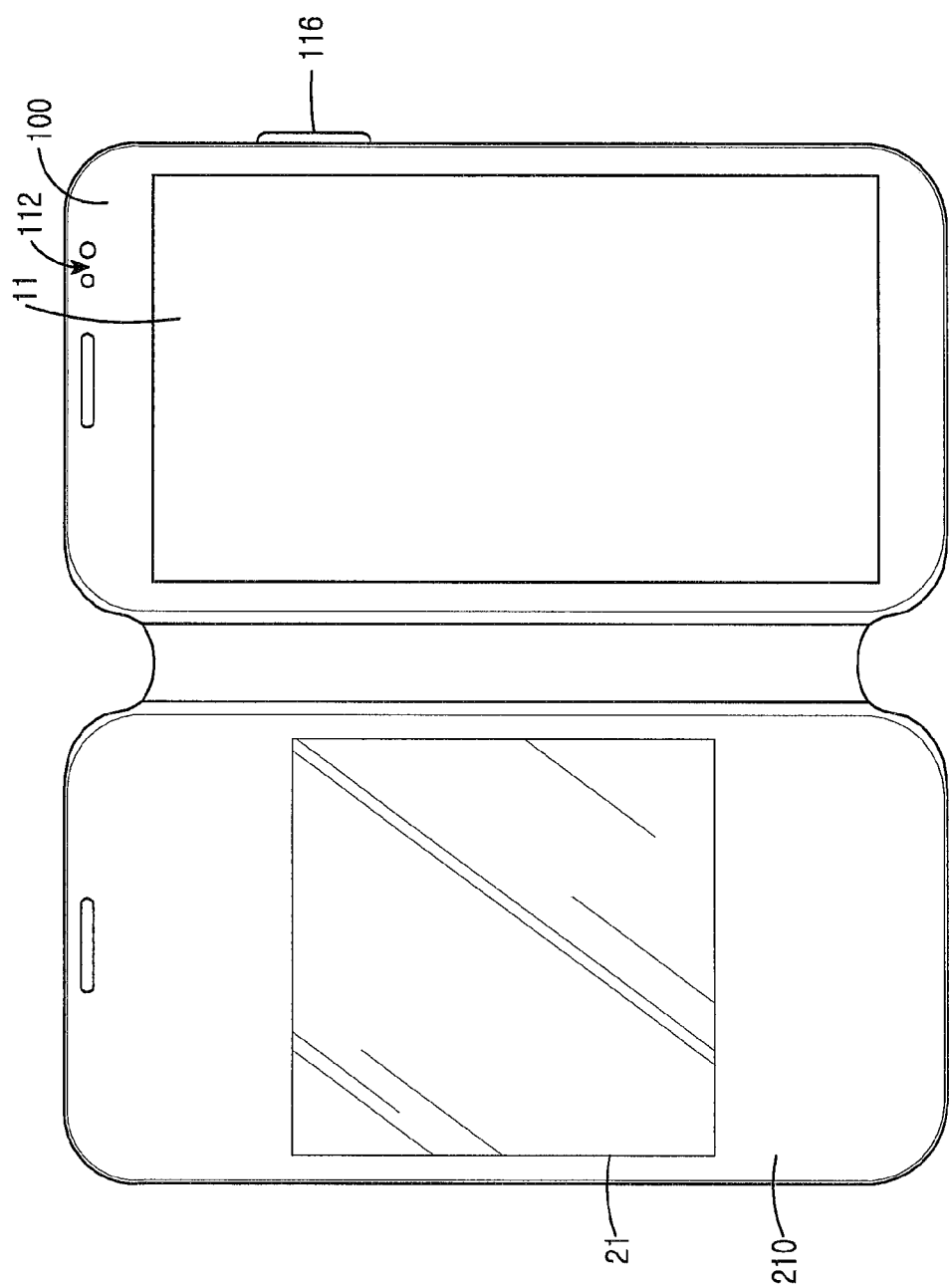
FIGS. 7A and 7B illustrate the screen of the opened cover in the electronic device according to embodiments of the present disclosure.
Figure 8A:
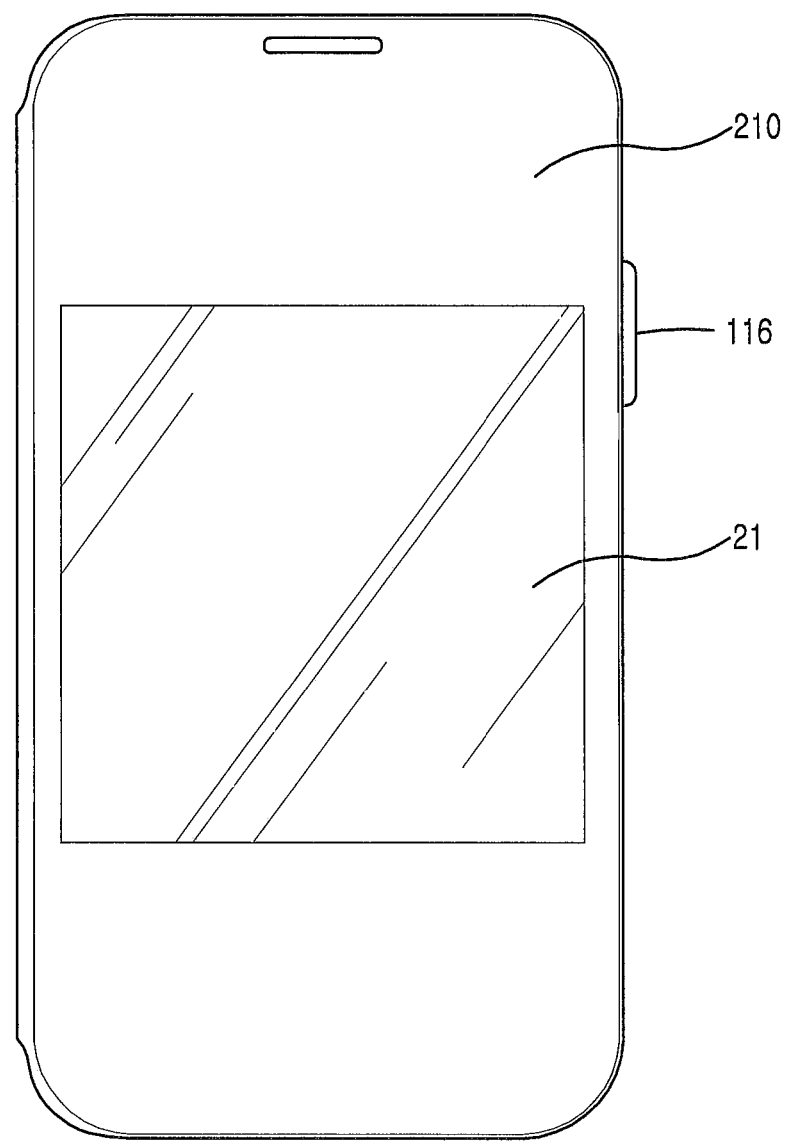
FIGS. 8A and 8B illustrate the screen of the closed cover in the electronic device according to embodiments of the present disclosure.

Referring to FIG. 6, the electronic device determines whether the screen display request occurs in step 601. For example, the electronic device can determine whether the screen display request occurs based on user's manipulation. More specifically, in a standby mode (e.g., sleep mode or idle mode) as shown in FIG. 7A or FIG. 8A, the electronic device can determine whether the screen display request occurs based on the input of the power button 116.

For example, the electronic device can determine whether the screen display request occurs based on a system event. In detail, the electronic device can determine whether the screen display request occurs based on at least one event of the incoming call, the incoming message, and the alarm (e.g., system alert, or preset time alarm) in the standby mode.

For example, the electronic device can determine whether the screen display request occurs based on a cover open event. In detail, when the cover is closed as shown in FIG. 8A, the electronic device can determine whether the cover is opened in the standby mode as shown in FIG. 7A.

Figure 7B:
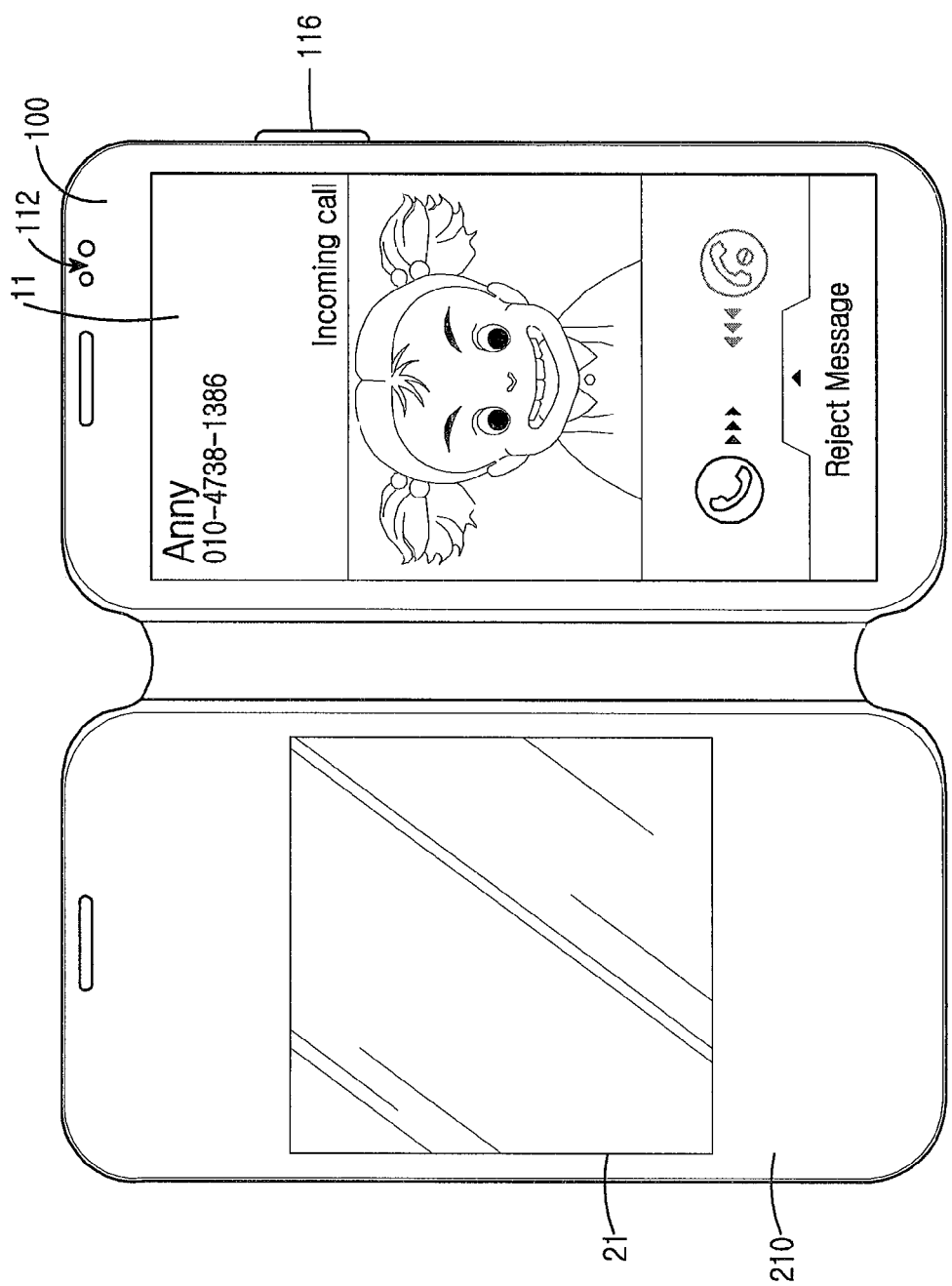
Figure 8B:
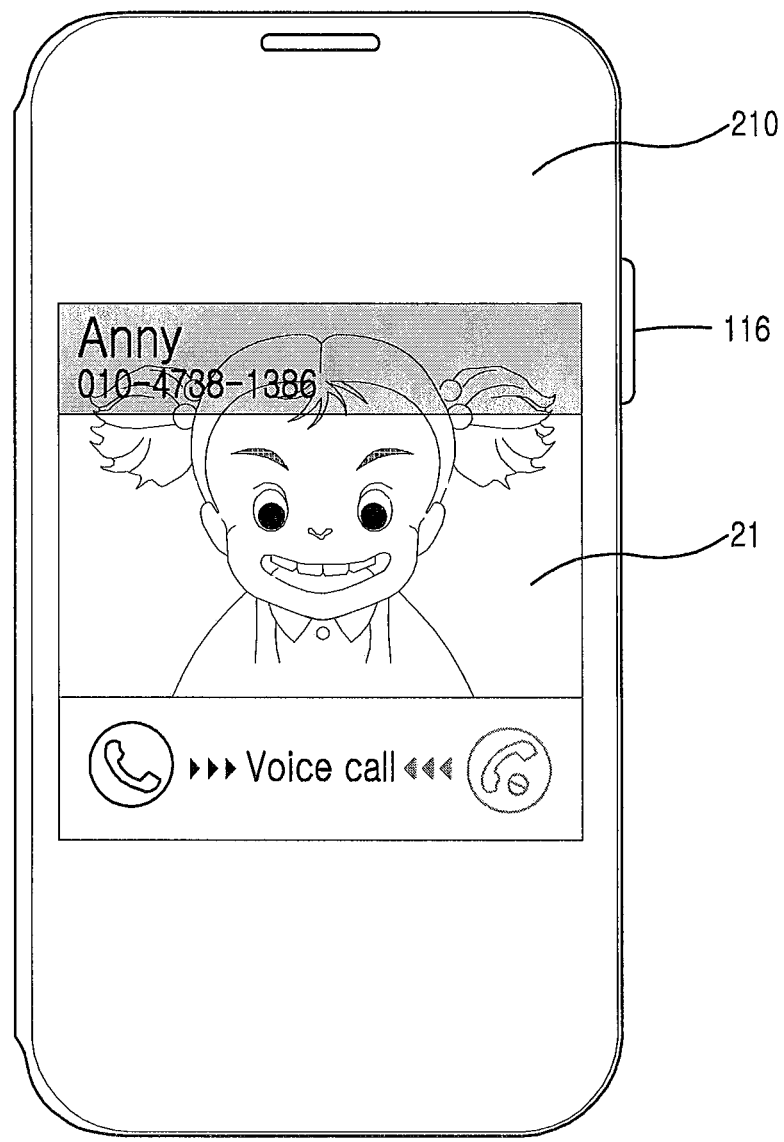

When the cover is closed and the screen is displayed through the cover window as shown in FIG. 8B, the electronic device can determine whether the cover is opened as shown in FIG. 7B. When the screen display request does not occur, the electronic device finishes this process.

By contrast, when the screen display request occurs, the electronic device determines whether the cover is opened or closed in step 603. For example, when the screen display is requested, the electronic device can determine whether the cover 210 is open as shown in FIG. 7B. For example, the electronic device can determine whether the cover 210 is closed as shown in FIG. 8B.

When the cover is opened, the electronic device displays the screen in the whole region in step 605 as shown in FIG. 7B.

By contrast, when the cover is closed, the electronic device displays the screen in the window region of the cover in step 607 as shown in FIG. 8B.

Next, the electronic device finishes this process.

Figure 9:
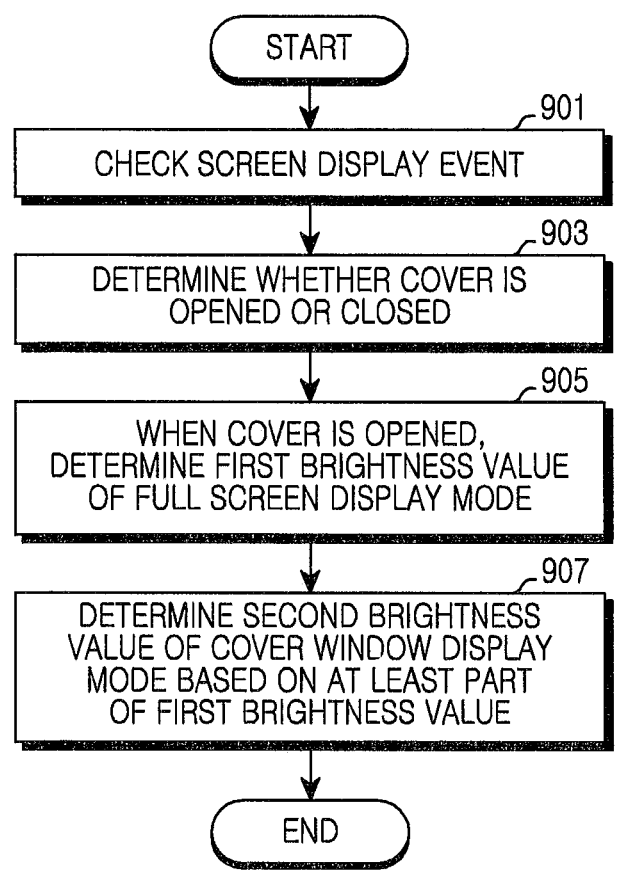
FIGS. 9 and 10 illustrate the method for determining a brightness of a cover window display mode in the electronic device according to embodiments of the present disclosure.
Figure 10:
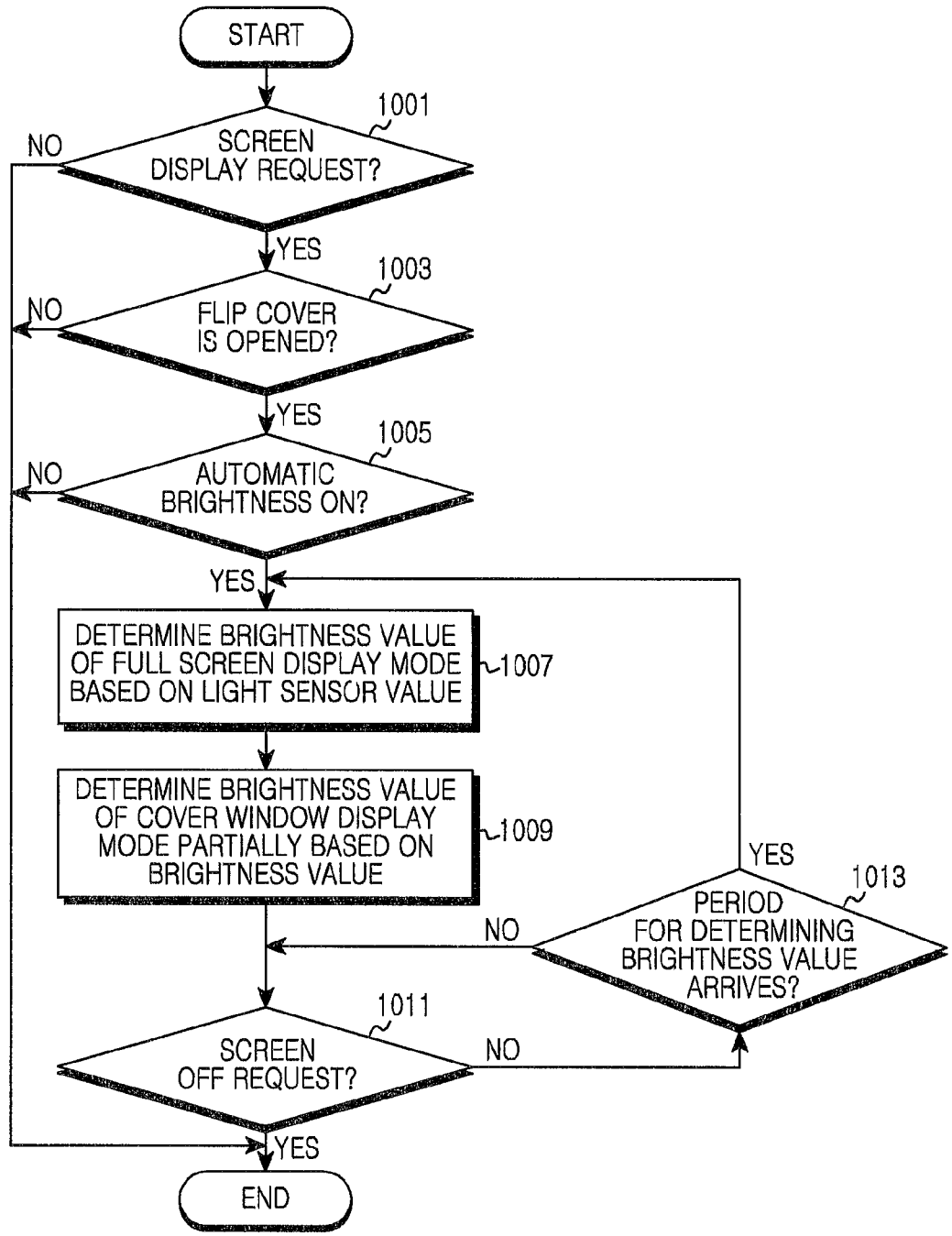

FIGS. 9 and 10 illustrate the method for determining the brightness of the cover window display mode in the electronic device according to embodiments of the present disclosure.

Referring to FIG. 9, the electronic device determines whether the screen display event occurs in step 901. For example, the electronic device can determine whether the screen display request occurs based on the user's manipulation. More specifically, in the standby mode (e.g., sleep mode or idle mode) as shown in FIG. 7A or FIG. 8A, the electronic device can determine whether the screen display request occurs based on the input of the power button 116.

For example, the electronic device can determine whether the screen display request occurs based on the system event. In detail, the electronic device can determine whether the screen display request occurs based on at least one event of the incoming call, the incoming message, and the alarm (e.g., system alert, or preset time alarm) in the standby mode.

For example, the electronic device can determine whether the screen display request occurs based on the cover open event. In detail, when the cover is closed as shown in FIG. 8A, the electronic device can determine whether the cover is opened in the standby mode as shown in FIG. 7A.

When the cover is closed and the screen is displayed through the cover window as shown in FIG. 8B, the electronic device can determine whether the cover is opened as shown in FIG. 7B.

In step 903, the electronic device determines whether the cover is opened or closed. For example, when the screen display is requested, the electronic device can determine whether the cover 210 is open as shown in FIG. 7B. For example, the electronic device can determine whether the cover 210 is closed as shown in FIG. 8B.

When the cover is opened, the electronic device determines the first brightness value of the full screen display mode in step 905. Herein, in the automatic brightness mode, the electronic device can determine the first brightness value of the full screen display mode based on the light sensor value.

In step 907, the electronic device determines the first brightness value determined in step 905, as the second brightness value of the cover window display mode. For example, when the first brightness value of the full screen display mode is set to 20, the electronic device can determine the second brightness value of the cover window display mode as 20. For example, when the first brightness value of the full screen display mode is set to 50, the electronic device can determine the second brightness value of the cover window display mode as 50.

Next, the electronic device finishes this process.

Referring to FIG. 10, the electronic device determines whether the screen display request occurs in step 1001. For example, the electronic device can determine whether the screen display request occurs based on the user's manipulation. More specifically, in the standby mode (e.g., sleep mode or idle mode) as shown in FIG. 7A or FIG. 8A, the electronic device can determine whether the screen display request occurs based on the input of the power button 116.

For example, the electronic device can determine whether the screen display request occurs based on the system event. In detail, the electronic device can determine whether the screen display request occurs based on at least one event of the incoming call, the incoming message, and the alarm (e.g., system alert, or preset time alarm) in the standby mode.

For example, the electronic device can determine whether the screen display request occurs based on the cover open event. In detail, when the cover is closed as shown in FIG. 8A, the electronic device can determine whether the cover is opened in the standby mode as shown in FIG. 7A.

When the cover is closed and the screen is displayed through the cover window as shown in FIG. 8B, the electronic device can determine whether the cover is opened as shown in FIG. 7B. By contrast, when the screen display is not requested, the electronic device stays in the standby mode and finishes this process.

When the screen display request occurs, the electronic device determines whether the cover is opened or closed in step 1003. For example, when the screen display is requested, the electronic device can determine whether the cover 210 is open as shown in FIG. 7B. For example, the electronic device can determine whether the cover 210 is closed as shown in FIG. 8B. When the cover is closed, the electronic device finishes this process.

When the cover is opened, the electronic device determines the automatic brightness is activated (ON) in step 1005. When the automatic brightness is inactive (OFF), the electronic device finishes this process.

By contrast, when the automatic brightness is activated, the electronic device determines the brightness value of the full screen display mode based on the light sensor value in step 1007. Herein, it is assumed that the light sensor can detect the range from a minimum value of 0 Lux to a maximum value of 10000 Lux. It is also assumed that the brightness value of the full screen display mode ranges from the minimum value of 0 to the maximum value of 100.

For example, when the light sensor detects the brightness of 10000 Lux, the electronic device can determine the brightness of the full screen display mode as 100. For example, when the light sensor detects the brightness of 5000 Lux, the electronic device can determine the brightness of the full screen display mode as 50.

In step 1009, the electronic device determines the brightness value of the full screen display mode as the brightness value of the cover window display mode. For example, when the brightness of the full screen display mode set to 100, the electronic device can determine the brightness of the cover window display mode as 100. For example, when the brightness of the full screen display mode set to 50, the electronic device can determine the brightness of the cover window display mode as 50.

In step 1011, the electronic device determines whether a screen off request occurs. For example, the electronic device can determine whether the screen off request occurs based on the user's manipulation. More specifically, the electronic device can determine whether the screen off request occurs based on the input of the power button 116 in the screen turned off as shown in FIG. 7B.

For example, the electronic device can determine whether the screen off request occurs based on the system event. In detail, when no user input is applied during a reference time in the turned-off screen as shown in FIG. 7B, the electronic device enters the standby mode. In so doing, the electronic device can determine whether the screen off request occurs based on the standby mode entrance.

When the screen off request does not occur, the electronic device determines whether a period for determining the brightness value arrives in step 1013. For example, the electronic device can re-detect the ambient light using the light sensor 112 in the turned-off screen as shown in FIG. 7B, and determine whether the period for updating the brightness value of the full screen display mode arrives.

When the period for determining the brightness value does not arrive yet, the electronic device determines whether the screen off request occurs in step 1011.

When the period for determining the brightness value arrives, the electronic device determines the brightness value of the full screen display mode based on the light sensor value in step 1007.

By contrast, when the screen off request occurs, the electronic device finishes this process.

In this embodiments, when the automatic brightness mode is activated, the electronic device determines the screen brightness based on the light sensor value. Alternatively, when the automatic brightness mode is deactivated, the electronic device can determine the screen brightness according to the system or the user.

In addition, after the screen brightness value is determined, the electronic device can determine the brightness value below a reference brightness value by force according to a power-save mode. When the screen brightness value is determined and the temperature (e.g., the battery) inside the electronic device exceeds a reference temperature, the electronic device can determine the brightness value below the reference brightness value by force.

According to various embodiments of the present disclosure, the electronic device determines the second brightness value based on at least part of the first brightness value. In so doing, the second brightness value can be greater or smaller than the first brightness value by the selected value or the selected rate.

For example, when the first brightness value is 50, the electronic device can determine the second brightness value to be darker than the first brightness value by 20%. In this case, the second brightness value can be 40.

For example, when the first brightness value is 70, the electronic device can determine the second brightness value to be darker than the first brightness value by 10. In this case, the second brightness value can be 60.

As set forth above, since the electronic device determines the second brightness value of the cover window display mode based on at least part of the first brightness value of the full screen display mode, the user of the electronic device can adequately control the brightness of the full screen display mode and the cover window display mode.

It will be appreciated that embodiments of the present disclosure according to the claims and description in the specification can be realized in the form of hardware, software or a combination of hardware and software. Any such software can be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software can be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for operating an electronic device, the method comprising:
   if detecting that a display of the electronic device is not covered by a protection cover, displaying a first UI by using all parts of the display according to a first brightness value determined based on an amount of light measured by a light sensor of the electronic device;
   determining a second brightness value based on the first brightness value without using the light sensor, the second brightness value being a brightness value for displaying a second UI when the display is covered by the protection cover;
   detecting that the display is covered by the protection cover; and
   displaying the second UI according to the second brightness value using a part of the display corresponding to a window of the protection cover.

2. The method of claim 1, wherein displaying the first UI comprises:
   if the display is not covered by the protection cover, determining whether an automatic brightness mode is activated; and
   if the automatic brightness mode is activated, determining the first brightness value based on a light sensor value.

3. The method of claim 2, wherein determining the first brightness value comprises:
   if the automatic brightness mode is activated, determining whether a period for updating the first brightness value arrives; and
   when the period arrives, updating the first brightness value based on the light sensor value.

4. The method of claim 3, wherein determining the second brightness value comprises:
   when the first brightness value is updated, updating the second brightness value based on the updated first brightness value.

5. The method of claim 1, wherein the second brightness value is determined by a value which is equal to or less than the first brightness value.

6. The method of claim 1, further comprising setting a first storage space configured to store the first brightness value and a second storage space configured to store the second brightness value, to different storage spaces.

7. The method of claim 6, further comprising when the first brightness value is determined, storing the first brightness value to the first storage space and the second storage space at a same time.

8. The method of claim 1, further comprising:
   in response to detecting an event for displaying a screen of the display, determining whether the display is covered by the protection cover.

9. The method of claim 1,
   wherein the protection cover comprises a transparent part and a remaining part, and
   wherein the transparent part comprises the window.

10. An electronic device comprising:
    a display;
    one or more light sensors;
    one or more memories; and
    one or more processors configured to:
      if the display is not covered by a protection cover, display a first UI by using all parts of the display according to a first brightness value determined based on a light sensor value measured by one or more light sensors;
      determine a second brightness value based on the first brightness value without using the light sensor, the second brightness value being a brightness value for displaying a second UI when the display is covered by the protection cover;

detect that the display is covered by the protection cover; and display the second UI according to the second brightness value using a part of the display corresponding to a window of the protection cover.

11. The electronic device of claim 10, wherein the one or more processor is configured to:

determine, if the display is not covered by the protection cover, whether an automatic brightness mode is activated; and determine, if the automatic brightness mode is activated, the first brightness value based on the light sensor value.

12. The electronic device of claim 11, wherein the one or more processor is configured to:

determine, if the automatic brightness mode is activated, whether a period for updating the first brightness value arrives; and update the first brightness value based on a light sensor value when the period arrives.

13. The electronic device of claim 12, wherein the one or more processor is configured to update the second brightness value based on the updated first brightness value when the first brightness value is updated.

14. The electronic device of claim 10, wherein the second brightness value is determined by a value which is equal to or less than the first brightness value.

15. The electronic device of claim 10, wherein the one or more processor is configured to:

store the first brightness value in a first storage space of the one or more memories; and store the second brightness value in a second storage space of the one or more memories.

16. The electronic device of claim 15, wherein, when the first brightness value is determined, the one or more processor is further configured to store the first brightness value to the first storage space and the second storage space at a same time.

17. The electronic device of claim 10, wherein the one or more processor is further configured to:

determine, in response to detecting an event for displaying a screen of the display, whether the display is covered by the protection cover.

18. The electronic device of claim 10, wherein the protection cover comprises a transparent part and a remaining part, and wherein the transparent part comprises the window.

* * * * *